Sept. 16, 1958     F. R. LOHMAN     2,851,862
RAPID SAW
Filed Dec. 26, 1956

INVENTOR
Frederick R. Lohman

2,851,862

RAPID SAW

Frederick R. Lohman, Bremerton, Wash.

Application December 26, 1956, Serial No. 630,650

5 Claims. (Cl. 29—69)

This invention relates to saws for sizing finger rings.

Stone set rings cannot be successfully stretched or shrunk. The present method of sizing is to cut the ring with a jeweler's hacksaw and in making larger, a half size larger insert has to be added and held with pliers while sawing and filing to fit. Since the insert is usually only about 1/16 of an inch long, it is very difficult to hold and cut squarely.

It is accordingly a principal object of the present invention to provide a saw which revolutionizes the method of sizing stone set, unset and band rings that cannot be shrunk or stretched enough in sizing and which takes the hard work out of ring sizing.

It is another object of the present invention to provide a saw for finger rings of the above type which cuts squarely and to the exact length the insert to be added and gold soldered.

It is still another object of the present invention to provide a saw of the above type which cuts to slant required for use with rapid soldering ring sticks now being manufactured, and which provides an excellent fitting joint, the saw making the cut with a few turns in a fraction of the time usually used in sawing with a jeweler's hacksaw.

For other objects and for a better understanding of the invention, reference may be had to the following detailed description taken in connection with the accompanying drawing, in which.

Figure 1:
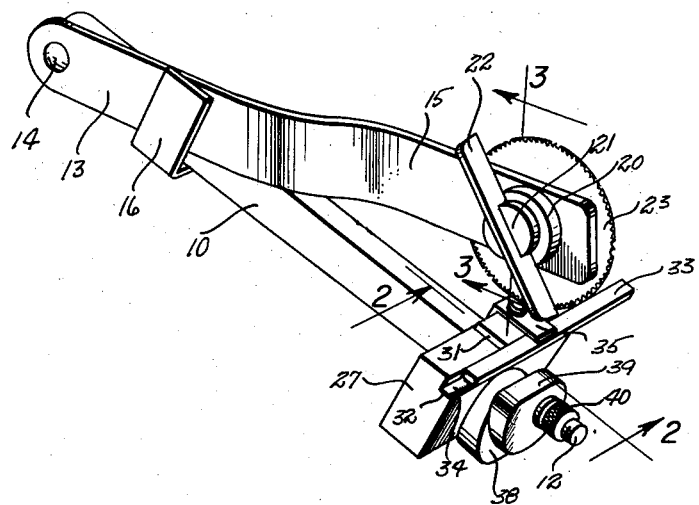
Figure 1 is a perspective view of a preferred embodiment of the present invention shown in operative use.

Referring now more in detail to the drawing, 10 represents an elongated square bar or support which fixedly mounts at the forward end thereof the longitudinally extending stud 11 having the externally threaded portion 12, substantially as illustrated.

A flat rectangular lever bar 13 is pivotally mounted on the side of the rear end of the bar 10 by means of the nut and bolt assembly 14 and includes the inwardly offset forward portion 15 which is aligned vertically with the center of the bar 10 and which extends beyond the forward end of the latter for a purpose which will hereinafter become clear. An L-shaped guide 16 has the horizontal portion thereof secured to the undersurface of bar 10 with the vertical portion thereof serving to guide the lever 15 when rotated about the axis of the nut and bolt assembly 14, as will be obvious.

Figure 3:
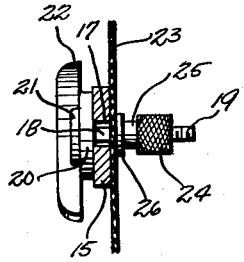
Fig. 3 is a vertical sectional view taken along the line 3—3 of Fig. 1.
Figure 4:
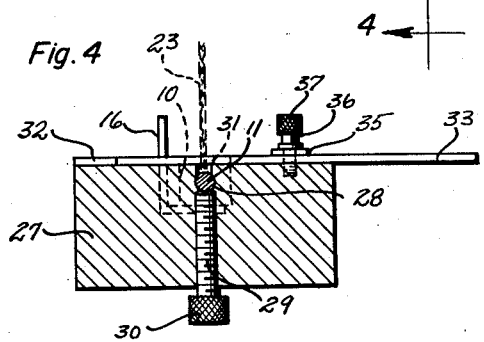
Fig. 4 is a vertical sectional view taken along the line 4—4 of Fig. 2.

The forward end of the bar 15 above the stud 11 is provided with a transverse opening 17 therethrough (Fig. 3) and which receives therethrough the shaft 18 having the externally threaded end portion 19. The other end of the shaft 18 is integrally formed with the cylindrical enlargement 20 which is in turn integrally formed with the reduced cylindrical portion 21 having a transverse slot within which is fixedly mounted the handle 22 whereby to rotate the shaft 18. A circular saw blade 23 is positioned on the shaft 18 against the face of the bar 15, and is secured thereat by means of the externally knurled nut 24 having the reduced neck 25 and the enlarged shoulder 26 which abuts the other face of the saw blade 23.

A laterally extending solid rectangular saw table 27 is provided with a longitudinal bore 28 (Fig. 2) near the top central portion thereof which receives therethrough the stud 11, thus rotatably mounting the saw table 27 thereon. A lock screw 29 having an enlarged, externally knurled head 30 is screw threaded upwardly through the bottom of the saw table 27 with the upper end thereof bearing on the stud 11, whereby to lock the saw table 27 at any desired position relative to the bar 10, as will be obvious. The upper end of the saw table 27 is provided with a downwardly extending slot 31 extending therethrough and which is adapted to receive downwardly therewithin the saw blade 23 with the lever 15 in the lowered position.

The upper end of the saw table 27 at the front thereof is provided with a transverse groove 32 of rectangular cross section which receives therewithin the gold bar 33 which it is desired to cut, one end of the groove 32 being graduated, as at 34 for measurement of the bar 33, as will be obvious. The bar 33 is locked in the adjusted position by means of an L-shaped clamp 35 and a lock screw 36 passing downwardly therethrough and screw threaded into the top of the saw table 27, the lock screw 36 having the enlarged, externally knurled head 37.

The stud 11 extends forwardly of the table 27 and receives thereon the finger ring 38, the ring being retained flush against the forward face of the table 27 by means of the oblong wedge-shaped fiber washer 39 and the externally knurled nut 40 similar in construction to the nut 24 previously described.

In operation, the ring 38 to be sized is cut with a few turns of the handle 22 after the lever bar 15 has been lowered to bring the saw blade 23 into the groove 31 and into engagement with the upper end of the ring 38. The exact length of the gold insert is then easily cut with square ends on the graduated groove 32 in a similar manner. The saw will cut squarely and to the exact length required to be added and gold soldered. It will cut to a slant required for use with the rapid soldering ring sticks now in use by adjustment to the table by means of the lock screw 29 and provides an excellent fitting joint.

While various changes may be made in the detail construction, it shall be understood that such changes shall be within the spirit and scope of the present invention as defined by the appended claims.

Figure 2:
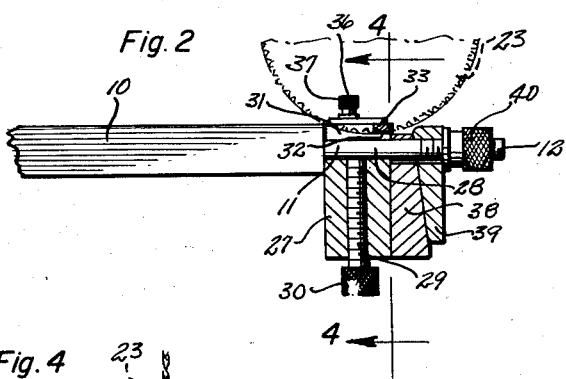
Fig. 2 is a longitudinal sectional and vertical view thereof taken along the line 2—2 of Fig. 1.

In Figs. 1 and 2, the ring 38 is positioned so as to permit the cutting of the gold bar 33, following which the saw blade will pass downwardly through the groove 31 to permit the saw blade to cut the ring.

What I claim as new and desire to protect by Letters Patent of the United States is:

1. A device for sizing finger rings comprising an elongated support, a saw table rotatably mounted at the forward end of said support about a longitudinal axis, means for locking the position of said saw table relative to said support, an elongated lever bar pivotally mounted at the other end of said support at one side thereof about a transverse axis, a manually operable rotatably mounted circular saw blade means at the free end of said lever bar for rotation about a transverse axis therethrough, said saw table having a longitudinal slot at the top thereof adapted to receive the saw blade means downwardly therewithin upon moving said lever bar against said support, means for positioning a gold bar across the top of the saw table for cutting the same upon movement of the saw blade means downwardly into the groove and the rotation thereof, and adjustable means for positioning a finger ring adjacent to said slot and against the forward face of the saw table in the same path of movement said saw blade means as said gold bar.

2. A device according to claim 1, said lever bar being inwardly offset at the forward end thereof so as to permit the vertical alignment of the saw blade means mounted thereon with said groove, and an L-shaped guide having a horizontal portion secured to the undersurface of said support and a vertical portion slidably abutting the side of the lever bar whereby to guide the same.

3. A device according to claim 2, said means rotatably mounting said saw table on the forward end of said support comprising a longitudinally extending stud secured to the end of the support, said table having a longitudinal bore receiving said stud therethrough, said means for locking said saw table comprising lock screw means screwed upwardly through the bottom thereof and adapted to engage the stud to prevent rotational movement of the saw table after it has been adjusted.

4. A device according to claim 3, said means for positioning the gold bar comprising said saw table at the top thereof at the forward end having a transverse groove of rectangular cross section adapted to receive therewithin the gold bar within one end of said first groove, an L-shaped clamp secured to the rear and top faces of the saw table by means of a second lock screw, the end of said L-shaped clamp engaging the gold bar within the groove when in the proper position and permitting its adjustment by releasing the lock screw, one end of said second groove being calibrated so as to indicate the length of the gold bar being cut at any desired position of the latter.

5. A device according to claim 4, said means for positioning the finger ring comprising said stud extending forwardly beyond the end of the saw table and terminating in an externally threaded portion, the ring being received upon said stud and abutting the front face of the saw table, a wedge-shaped fiber washer positioned on said stud and abutting the ring, and nut means on the externally threaded end of said stud whereby to secure the ring between the saw table and washer and to permit its vertical adjustment relative to the path of the saw blade means.

References Cited in the file of this patent

UNITED STATES PATENTS 1,867,342    Wieg  ---------------- July 12, 1932